(12) United States Patent
Liu et al.

(10) Patent No.: US 7,567,722 B2
(45) Date of Patent: Jul. 28, 2009

(54) DYNAMICALLY SCALED FILE ENCODING

(75) Inventors: Shizhong Liu, San Diego, CA (US);
Phan L. Do, San Diego, CA (US);
William Yee-Ming Huang, San Diego,
CA (US); Charles S. Han, San Diego,
CA (US); Suhail Jalil, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 863 days.

(21) Appl. No.: 11/087,226

(22) Filed: Mar. 22, 2005

(65) Prior Publication Data

US 2006/0215912 A1    Sep. 28, 2006

(51) Int. Cl.
G06K 9/46 (2006.01)
H04N 7/12 (2006.01)
H04N 11/02 (2006.01)
H04N 11/04 (2006.01)

(52) U.S. Cl. .................. 382/248; 348/395.1
(58) Field of Classification Search ............... 382/166, 382/232, 248, 251; 348/395.1, 403.1
See application file for complete search history.

(56) References Cited

U.S. PATENT DOCUMENTS

| | | | | |
|---|---|---|---|---|
| 5,126,857 A * | 6/1992 | Watanabe et al. | ........... | 382/166 |
| 5,596,602 A * | 1/1997 | Couwenhoven et al. | ...... | 375/240 |
| 5,650,860 A * | 7/1997 | Uz | .............................. | 382/253 |
| 5,911,006 A * | 6/1999 | Funamoto et al. | ........... | 382/232 |
| 5,959,675 A * | 9/1999 | Mita et al. | ............. | 375/240.04 |
| 6,148,107 A * | 11/2000 | Ducloux et al. | ............. | 382/236 |
| 6,195,462 B1 | 2/2001 | Bryniarski et al. | | |
| 6,356,668 B1 | 3/2002 | Honsinger et al. | | |
| 6,504,494 B1 * | 1/2003 | Dyas et al. | ..................... | 341/50 |
| 6,600,836 B1 * | 7/2003 | Thyagarajan et al. | ....... | 382/239 |
| 6,668,089 B1 * | 12/2003 | Bracamonte et al. | ........ | 382/239 |
| 2002/0093953 A1 * | 7/2002 | Naim et al. | ................. | 370/386 |
| 2002/0131645 A1 * | 9/2002 | Hamilton | .................... | 382/251 |
| 2003/0161542 A1 | 8/2003 | Ridge | | |
| 2004/0008897 A1 * | 1/2004 | Easwar | ....................... | 382/250 |

OTHER PUBLICATIONS

Ding et al. ("Rate control of MPEG video coding and recording by rate-quantization modeling," IEEE Transaction on Circuits and Systems for Video Technology, vol. 6, No. 1, Feb. 1996, pp. 12-20).*
Ding et al. ("Rate control of MPEG video coding and recording by rate-quantization modeling," IEEE Transaction on Circuits and Systems for Video Technology, vol. 6, No. 1, Feb. 1996, pp. 12-20).*
He, Zhihai, et al. A Linear Source Model and a Unified Rate Control Algorithm for DCT Video Coding. IEEE Transactions on Circuits and Systems for Video Technology, 2002, pp. 970-982, vol. 12, No. 11, XP 1133428A.

* cited by examiner

*Primary Examiner*—Yubin Hung
(74) *Attorney, Agent, or Firm*—Kyong H. Macek; Michael J. DeHaemer (57) ABSTRACT

A dynamically scaled file encoding method and apparatus are disclosed. A file encoding system using JPEG encoding can be configured to produce relatively constant compressed file sizes irrespective of the initial file size and file contents. The system retrieves an initial file or image that is to be compressed and determines a target bit rate corresponding to the compressed file. The target bit rate is used to determine an initial scaling factor. The initial file is encoded using a JPEG encoder having coefficients scaled by the initial scaling factor. The resultant bit rate can be adjusted in a second loop if greater than the desired bit rate. To adjust the bit rate, a recomputed scaling factor is determined from the resultant bit rate. The initial file is then encoded with coefficients scaled by the recomputed scaling factor to achieve a bit rate that is within the target bit rate.

33 Claims, 7 Drawing Sheets

DYNAMICALLY SCALED FILE ENCODING

FIELD

The disclosure relates to the field of electronic file compression. More particularly, the disclosure relates to dynamic determination of electronic file compression in a communication system.

BACKGROUND

Wireless communication systems have evolved from systems dedicated to carrying voice communications, to third generation (3G) systems that are configured to support high data rates. As such, wireless communication systems are increasingly being used for distribution of data and information. The data and information distributed across wireless communication systems are often contained within large data files. Wireless communication systems, such as cellular telephone systems, have evolved to handle the large amounts of data being transmitted over the system. Wireless communication devices are often configured with the ability to send or receive data files. The data files may include ring tone files and picture files.

However, even in 3G systems, efficient transmission of the data and information over the wireless system is a priority because wireless communication systems are often constrained to operate within a fixed bandwidth or frequency spectrum allocated by governing bodies.

For example, with the rapid growing 3G wireless services, digital camera phones become increasingly popular in our daily life. People can exchange digital images instantly across the advanced 3G wireless networks. However, due to the tremendous data amount of each image, wireless carriers typically impose a file size limit to each compressed image, for example 100 KB, for efficient usage of the precious wireless bandwidth. A digital camera can easily capture an image that exceeds the constraints imposed by a service provider. Therefore, before a handset sends a picture over the wireless networks, it may have to ensure the picture file size is not over the limit enforced by the wireless carriers.

A device, such as a wireless handset, may incorporate file compression in order to help conform to the file size limitations imposed by system providers. However, file compression and the resultant compression ratio can depend on the contents of the file. Two files of the exact same initial size may produce different compressed file sizes, due to the sensitivity of an encoding algorithm to file contents. Therefore, it is desirable to have a file encoding technique that is able to consistently produce a compressed file size and that is relatively insensitive to file contents or original file size.

SUMMARY

A dynamically scaled file encoding method and apparatus are disclosed. A file encoding system using Joint Photographic Experts Group (JPEG) encoding can be configured to produce relatively constant compressed file sizes irrespective of the initial file size and file contents. The system retrieves an initial file or image that is to be compressed and determines a target bit rate corresponding to the target compressed file size. The target bit rate is used to determine an initial scaling factor. The initial file is encoded using a JPEG encoder having coefficients scaled by the initial scaling factor. If the resultant bit rate is above or far below the target bit rate, a new scaling factor is derived from the resultant bit rate. The initial file is then encoded with coefficients scaled by the new scaling factor to achieve a bit rate that is within the target bit rate.

One aspect of the method and apparatus includes an encoding system. The system includes an encoder configured to encode a source file using quantization parameters scaled by a scaling factor to produce an encoded file having a target file size less than a file size of the source file, and a scaling module configured determine the scaling factor used by the encoder based in part on the target file size and the file size of the source file.

Another aspect is directed towards an encoding system that includes a JPEG encoder configured to encode a captured image file to produce an encoded image file, the JPEG encoder encoding at least AC bits of the captured image file using quantization parameters scaled by a scaling factor, and a scaling module coupled to the JPEG encoder and configured to determine an initial scale factor based in part on a target file size and a number of pixels in the captured image file, and wherein the JPEG encoder is configured to encode the AC bits of the captured image file using quantization parameters scaled by the initial scale factor to produce an initial encoded file, and wherein the scaling module determines the scaling factor based in part on a file size of the initial encoded file.

Another aspect is further directed towards a method of scaling a file to produce an encoded file having a file size less than a file size constraint, including determining a target bit rate, determining an initial scale factor, encoding a source file using quantization parameters scaled with the initial scale factor to produce an initial encoded file, determining a revised bit rate, determining a scaling factor, and re-encoding the source file using quantization parameters scaled with the scaling factor to produce the encoded file.

Another aspect is directed towards an encoding system that includes an encoder configured to encode a source file using quantization parameters scaled by a scaling factor to produce an encoded file having a target file size less than a file size of the source file, and a scaling module configured determine the scaling factor used by the encoder based in part on a rate distortion curve determined from an initial encoded file generated by the encoder.

Another aspect is directed towards a method of scaling a file to produce an encoded file having a file size less than a file size constraint, including encoding a source file using an initial quantization table to produce an initial encoded file, determining a rate distortion curve based on the initial encoded file, determining a scaling factor based in part on the rate distortion curve, determining a scaled quantization table by scaling the initial quantization table by the scaling factor, and re-encoding the source file using the scaled quantization table to generate the encoded file.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION

A device within a wireless communication system may incorporate an apparatus and method of dynamically scaling a file size by scaling aspect of the encoding of the file. A file such as an image captured by a camera can have a size that is determined, in part, by the number of pixels used to define the picture. The image pixel width and pixel height can characterize a spatial dimension of the image. Based on a spatial dimension of the image, the file size can also be expressed as bit rate in terms of bits/pixel. The file size control can be viewed as the same problem as bit rate control.

Since JPEG compression is one of the most popular image compression methods used in to compress source images, this disclosure focuses on the JPEG rate control problem. In the JPEG standard, the encoding bit rate (bits/pixel) is controlled by quantization parameters. The quantization parameters are provided in matrices used in a Discrete Cosine Transform (DCT) process performed in an encoder. Typically, the larger the quantization parameters, the lower bit rate in a resultant file.

Based on extensive psycho-visual thresholding experiments, the JPEG standard recommends two standard quantization tables denoted by $Q_0$ and $Q_1$, respectively, with $Q_0$ for luminance component and $Q_1$ for chrominance components. The standard quantization tables are provided below in Table 1.

Although these tables may not be ideal for any particular application, they have been used for general 8-bit per sample image compression with good results. It is important to note that if the values in the tables are divided by 2, the reconstructed JPEG image is usually nearly indistinguishable from the original image.

tables $Q_0$ and $Q_1$. Thus, for each image file in the second embodiment, the device determines new quantization tables $Q_0'=Q_0/S$ and $Q_1'=Q_1/S$, where S is the scaling factor, corresponding to the given bit rate.

Therefore, the problem in the second embodiment can be characterized a one of estimating the scaling factor S for a given bit rate so that the encoding bit rate of the JPEG image compressed with the new quantization tables $Q_0'$ and $Q_1'$ satisfies the given bit rate. The disclosed methods and apparatus incorporate a model driven algorithm to estimate the scaling factor S for a given target bit rate. The methods and apparatus use a generic polynomial model to approximate the relationship between AC bits per pixel and the scaling factor S. The methods and apparatus are further configured to adapt the generic model to any particular image so that a scaling factor S for a given target AC bits per pixel can be derived accurately for each image file being processed.

Figure 1:
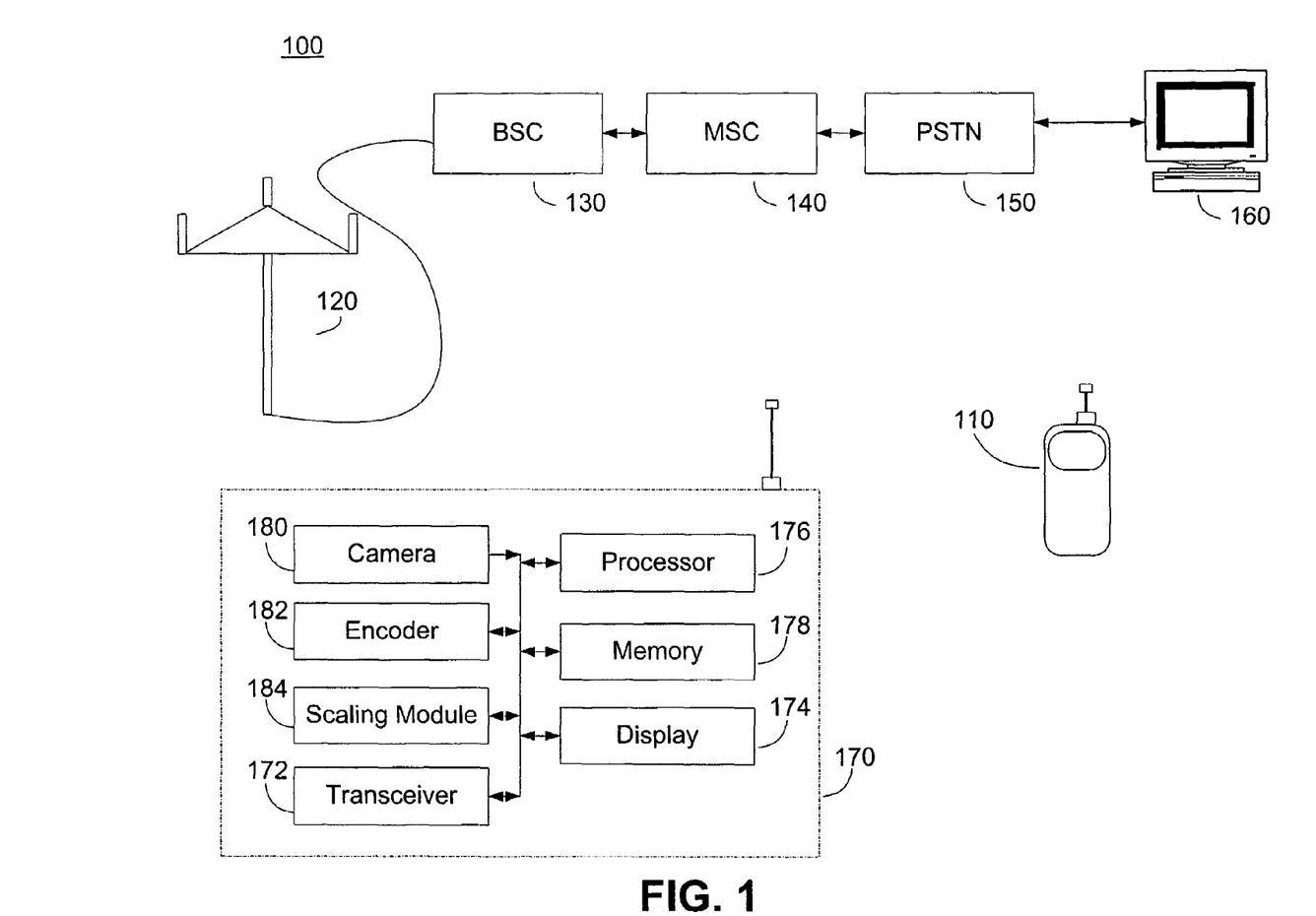
FIG. 1 is a functional block diagram of an embodiment of a wireless communication system including a communication device configured to perform dynamic scaling of file encoding.

FIG. 1 is a functional block diagram of an embodiment of a wireless communication system 100 having at least one user terminal 170 configured to scale file encoding to reduce the file size to approximately a predetermined file size. The dynamic scaling of the encoder can be particularly advantageous in wireless communication systems 100, where bandwidth is limited. However, the methods and apparatus are not limited to application in a wireless communication system 100, but are also applicable in wired systems.

The system includes one or more fixed elements that can be in communication with a mobile station 110. The mobile station 110 can be, for example, a wireless telephone configured to operate according to one or more communication standards. The one or more communication standards can include, for example, GSM, WCDMA, and CDMA2000 including 1x EV-DO, 1X EV-DV, and CDMA2000 3x. The mobile station 110 can be a portable unit or a mobile unit, and need not be continuously mobile, but may be stationary for periods of time. The mobile station 110 may also be referred to as a mobile unit, a mobile terminal, a user terminal, user equipment, a portable, a phone, and the like.

TABLE 1

Quantization Tables

| $Q_0 =$ | 16 | 11 | 10 | 16 | 24 | 40 | 51 | 61 | $Q_1 =$ | 17 | 18 | 24 | 47 | 99 | 99 | 99 | 99 |
|---|---|---|---|---|---|---|---|---|---|---|---|---|---|---|---|---|---|
| | 12 | 12 | 14 | 19 | 26 | 58 | 60 | 55 | | 18 | 21 | 26 | 66 | 99 | 99 | 99 | 99 |
| | 14 | 13 | 16 | 24 | 40 | 57 | 69 | 56 | | 24 | 26 | 56 | 99 | 99 | 99 | 99 | 99 |
| | 14 | 17 | 22 | 29 | 51 | 87 | 80 | 62 | | 47 | 66 | 99 | 99 | 99 | 99 | 99 | 99 |
| | 18 | 22 | 37 | 56 | 68 | 109 | 103 | 77 | | 99 | 99 | 99 | 99 | 99 | 99 | 99 | 99 |
| | 24 | 35 | 55 | 64 | 81 | 104 | 113 | 92 | | 99 | 99 | 99 | 99 | 99 | 99 | 99 | 99 |
| | 49 | 64 | 78 | 87 | 103 | 121 | 120 | 101 | | 99 | 99 | 99 | 99 | 99 | 99 | 99 | 99 |
| | 72 | 92 | 95 | 98 | 112 | 100 | 103 | 99 | | 99 | 99 | 99 | 99 | 99 | 99 | 99 | 99 |

In one embodiment, JPEG encoding of image files can implement optimization of the quantization parameters on an image by image basis. To encode a particular image at a given bit rate, the quantization tables can be redesigned to match the statistical properties of the given image so that the best image quality can be obtained for the given target bit rate. However, the high computational complexity of the optimization process may prohibits it from being a. practical solution, especially for those applications with limited computing horsepower and low-delay requirement.

In an alternative embodiment, a device can initialize a JPEG encoder with the recommended quantization tables and can derive new quantization tables by scaling the quantization The mobile station 110 typically communicates with one or more base stations 120, here depicted as a sectored cellular tower. The mobile station 110 will typically communicate with the base station 120 that provides the strongest signal strength at a receiver within the mobile station 110. Although only one base station 120 is shown in FIG. 1, a wireless communication system 100 typically has multiple base stations configured to provide coverage over a system coverage area.

The base station 120 can be coupled to a Base Station Controller (BSC) 130 that routes the communication signals to and from the appropriate base stations, such as 120. The BSC 130 is coupled to a Mobile Switching Center (MSC) 140 that can be configured to operate as an interface between the mobile station 110 and a Public Switched Telephone Network (PSTN) 150. Therefore, the MSC 140 is also coupled to the PSTN 150. The MSC 140 can also be configured to coordinate inter-system handoffs with other communication systems.

A communication device 160 can be connected to the PSTN 150 and can communicate with wireless devices that are in communication with the base station 120. The communication device 160 is depicted as a computer having a display. However, the communication device 160 may be a computer, phone, terminal, and the like.

A user terminal 170 can also be in communication with the base station 120. The user terminal 170 may be a mobile station, mobile unit, a mobile terminal, user equipment, a portable, a phone, a wireless modem equipped computer or computing device, a computer, a server, a personal digital assistant, and the like, or some other communication device. The user terminal 170 includes a transceiver 172 configured to transmit and receive the wireless communications with the base station 120. The user terminal 170 can also include a processor 176 and memory 178. The memory 178 can store one or more processor readable instructions in the form of software that can be executed by the processor 176. For example, the processor 176 in conjunction with instructions stored in memory 178 may perform baseband processing of signals that are coupled to and from the transceiver 172. The user terminal 170 may also include a display 174 that is configured to operate as a user interface.

The user terminal 170 may also include a camera 180 that can be configured to capture images. The captured images can be stored in memory 178 for viewing on the display 174 or for delivery to a destination device coupled to the wireless communication system 100.

An encoder 182 can be configured to encode the captured image to produce a file of a particular format. Additionally, the encoder 182 can be configured to encode the captured image file in a manner that compresses the file size. For example, the encoder 182 can be configured to perform JPEG encoding of a captured image file stored in memory 178.

The user terminal 170 can also be configured to include a scaling module 184 that operates in conjunction with the encoder 182 such that encoded image files are compressed to a desired file size. For example, the user terminal 170 may capture images using a camera 180, and each of the capture images may have a different size depending on a resolution of the image file. The user terminal 170 may also be configured to communicate the image files to another device coupled to the wireless communication system 100. The user terminal 170 can, for example, communicate the captured image file to the mobile station 110 or a communication device 160 coupled to the PSTN 150.

The wireless communication system 100 may have constraints on file size transfers over the system. The system file size constraints may be implemented, for example, to conserve the amount of usable bandwidth available on the system.

The user terminal 170 may therefore use the encoder 182 to compress the captured image prior to transmission over the wireless communication system 100. However, an encoder 182 configured to provide JPEG encoding produces different encoded file sizes depending on the image file. Two image files of nearly identical size may produce different encoded image sizes. Additionally, an encoder 182 using the nominal JPEG quantization tables may not sufficiently compress a captured image file such that the compressed image file is smaller than the file size constraint imposed by the wireless communication system.

The scaling module 184 therefore can operate in conjunction with the encoder 182 to produce a compressed image file that satisfies the file size constraints. The scaling module 184 first determines an initial scaling factor according to the target file size, then the encoder 182 encodes the captured image file using the initial scaling factor. The scaling module 184 can determine if initial encoding of a captured image file performed by the encoder 182 produces a compressed image file that is within predetermined file size constraints. If so, the scaling module 184 does not need to modify the quantization parameters used by the encoder 182 to compress the captured image file.

If the scaling module 184 determines that the compressed image file is greater or far less than the predetermined file size, the scaling module 184 recomputes a new scaling factor based on the resultant bit rate from the encoder 182. Then, the scaling module 184 can instruct the encoder 182 to re-encode the captured image file using the new scaling factor. The scaling module 184 determines a scaling factor, in part, based on the characteristics of the encoding process. For example, the encoder 182 may implement JPEG encoding and the scaling module 184 can determine a scaling factor for the JPEG quantization parameters using knowledge of the JPEG file format.

The encoder 182 and scaling module 184 are explicitly shown in the user terminal 170, but may also be present in one or more other devices or modules shown in FIG. 1. For example, the wireless communication system 100 may implement an encoder 182 and a scaling module 184 in the base station controller 130 to ensure that all image files broadcast by the base station 120 does not exceed a file size constraint. In other embodiments, the mobile station 110 and the communication device 160 can be configured with the encoder 182 and scaling module 184.

Although the JPEG encoder and scaling module are depicted as distinct modules, some or all of the functions performed by the modules may be performed by the processor 176 operating on instructions stored within memory 178. Additionally, the functions of one or more of the modules may be integrated into a single module or the functions of a single module may be performed by multiple distinct modules.

In a JPEG file, the bit stream mainly comprises the following components: JPEG header bits, including Huffman tables and quantization tables as well as other optional headers specified in JPEG standard, DC bits that encode DC components, AC bits that encode AC components, and End of Block bits. The number of JPEG header bits and End of Block bits is usually fixed and known before encoding. The number of DC bits is typically a small portion of the JPEG bit stream and does not change significantly across different scaling factors applied to the quantization parameters.

In one embodiment the DC quantization parameters are not scaled, and the number of DC bits does not change based on a scaling factor. In other embodiments, the DC quantization parameters can be scaled to provide a slight improvement in encoded file size.

The AC bits represent the major part of the JPEG bit stream and the number of AC bits can change dramatically across different scaling factors. Hence, understanding the relationship between the number of AC bits and the scaling factor establishes the foundation for JPEG bit rate control. In the following discussion, 'R' represents the number of AC bits per pixel.

In order to characterize the effects of the scaling factor (S) on JPEG encoding of captured images, a number of images with different characteristics were created. The various images were encoded with different scaling factors. The R-S curves for each of the sample images was plotted and compared.

It was observed that the R-S curve changed dynamically from image to image. However, for S=0, the scaled quantization values in $Q_0'$ and $Q_1'$ are all infinites. Therefore, all quantized AC coefficients will be zero, meaning R=0. As such, all R-S curves pass the origin (0,0). Furthermore, it was determined that all curves can be approximated by the following polynomial with reasonable errors:

$$S = AR^2 + BR$$

where A and B are constant coefficients, R is AC bits per pixel, and S is the scaling factor.

The polynomial model of R-S curves is used to compute a generic R-S model by using the median values of all A and B values in all test images. As a result, the following values were obtained: A=0.6869, B=1.5825. The derived generic R-S model is:

$$S = 0.6869R^2 + 1.5825R$$

However, the R-S curve can change dramatically from image to image. Thus, the generic R-S model may provide poor estimation accuracy when used to estimate the scaling factor S to apply to any particular image. The generic R-S model can be adapted in a two pass process to improve the accuracy of the scaling factor (S) estimate for a particular image.

Figure 2:
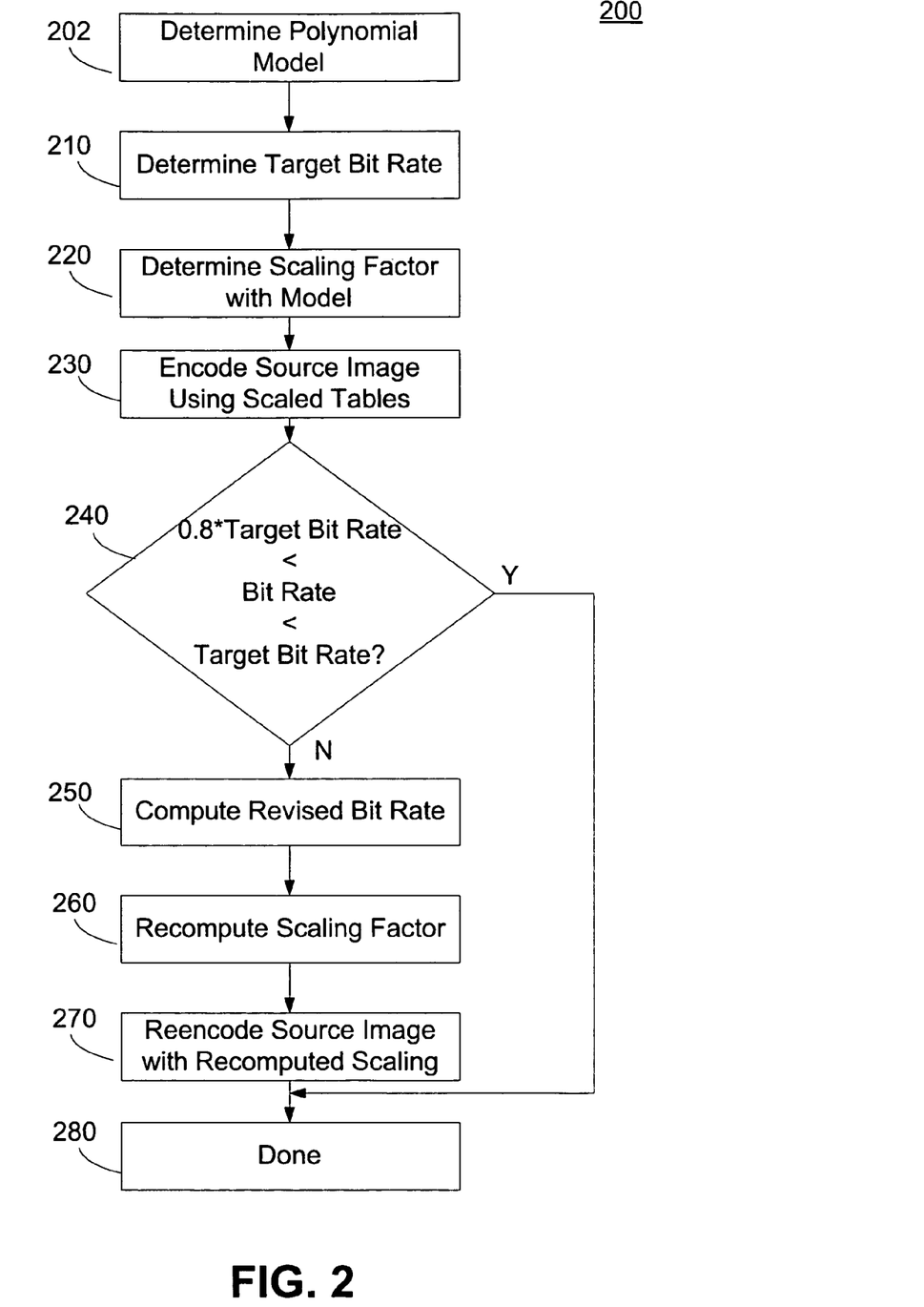
FIG. 2 is a flowchart of an embodiment of a method for dynamically scaling file encoding.

FIG. 2 is a flowchart of an embodiment of a method 200 for dynamically scaling file encoding. The method 200 can be implemented in the user terminal 170, particularly in the scaling module 184 and encoder 182, shown in FIG. 1.

The scaling module and encoder implementing the method 200 performs a two-pass JPEG bit rate control algorithm. In the method 200 of FIG. 2, the DC quantization parameters in both $Q_0$ and $Q_1$ are not scaled in the algorithm. However, in other embodiments, the DC parameters can also be scaled. For example, the scaling module and encoder may scale the DC parameters at the same time and using the same scaling factor as used for the AC parameters. Alternatively, a distinct method and scaling factor may be applied to the DC parameters.

The method 200 begins at block 202 where the user terminal 170, for example, in the scaling module 184 determines a scaling factor model, which can be a polynomial model. As discussed above, a polynomial model may be determined through studies or simulations of captured image files. Such an empirically derived polynomial model may be predetermined and loaded into memory 178 at the time of manufacture or during provisioning for access by the scaling module 184 and encoder 182.

The scaling module can then determine a target bit rate in block 210. The scaling module can determine a target bit rate, for example, based on the number of pixels in the captured image file. In another embodiment, the scaling module can select a target bit rate from a group of predetermined target bit rates based in part on a resolution of the captured image. In other embodiments, such as those in which the camera is limited to a single resolution, the target bit rate may be fixed and stored in memory.

The scaling module then determines a scaling factor in block 220 using the polynomial model. In the embodiment where the selections of target bit rate are defined, the associated scaling factors may also be predetermined. If the target bit rate is determined based on the captured image file, the target bit rate can be used as a variable in the scaling factor model to determine the appropriate scaling factor.

After determining the initial scaling factor, the scaling module can provide the scaling factor to the encoder, or can generate one or more scaled quantization tables using the scaling factor. The encoder, in block 230, encodes the source image using the scaled quantization tables. The encoder can, for example, output an encoded image file to memory.

The scaling module, at decision block 240 can retrieve the encoded image file from memory and can determine an actual bit rate associated with the encoded image file. The scaling module can then determine if the encoded image file, encoded with the scaling factor generated from the model, satisfies the target bit rate. If so, there is no need to adjust the scaling factor or re-encode the image file. The scaling module proceeds to block 280 and the method is done.

Returning to decision block 240, if the scaling module determines that the actual bit rate is greater or far less than the desired target bit rate, the scaling module proceeds to block 250 and adapts the generic scaling factor model to the particular image being processed by computing a revised bit rate.

The scaling module can adjust the scaling factor using knowledge of the initial scaled bit rate. The captured image file can be encoded with the revised scaling factor to produce an encoded image file that is less than or equal to the target bit rate.

In one embodiment, the scaling module adapts the generic scaling factor model to the particular image by using the initial scaling factor and the resultant bit rate obtained in the initial pass through the encoder. The adaptation process is:

If the resultant bit rate of pass one encoding $R_1$ is greater then the target bit rate $R_T$, then revise the bit rate $R_1 = R_1 + (R_1 - R_T)/4$.

A correction factor (K) is then determined as $K = S_1/(0.6869R_1^2 + 1.5825R_1)$, where $S_1$ is the initial scaling factor given by the scaling module 184.

The new scaling factor model for this particular image is $S = K(0.6869R^2 + 1.5825R)$, where S is the scaling factor and R is the AC bits per pixel.

The scaling module can then proceed to block 260 and determine a revised scaling factor. The recomputed scaling factor can be derived from the new scaling factor model. For example, the scaling module can compute the new scaling factor $S_2$ by using the updated scaling factor model. The scaling module can compute, for example $S_2 = K(0.6869R_T^2 + 1.5825R_T) = KS_1$. If $R_1 > R_T$, the recomputed scaling factor is less than the original scaling factor estimate, the resultant encoded image file will be smaller. If $R_1 < R_T$, the recomputed scaling factor is greater than the original scaling factor estimate, the resultant encoded image file will be larger. The scaling module can provide the recomputed scaling factor to the encoder, or can generate one or more scaled quantization tables using the recomputed scaling factor The encoder proceeds to block 270 and can then re-encode the captured image file using the quantization tables scaled by the recomputed scaling factor. The encoded image file can be stored in memory and can replace the previous encoded image file. After re-encoding the captured image file, the user terminal proceeds to block 280 and the method 200 is done. Overall, the rate control error of the method 200 is below about 10% of the target bit rate $R_T$.

Figure 3:
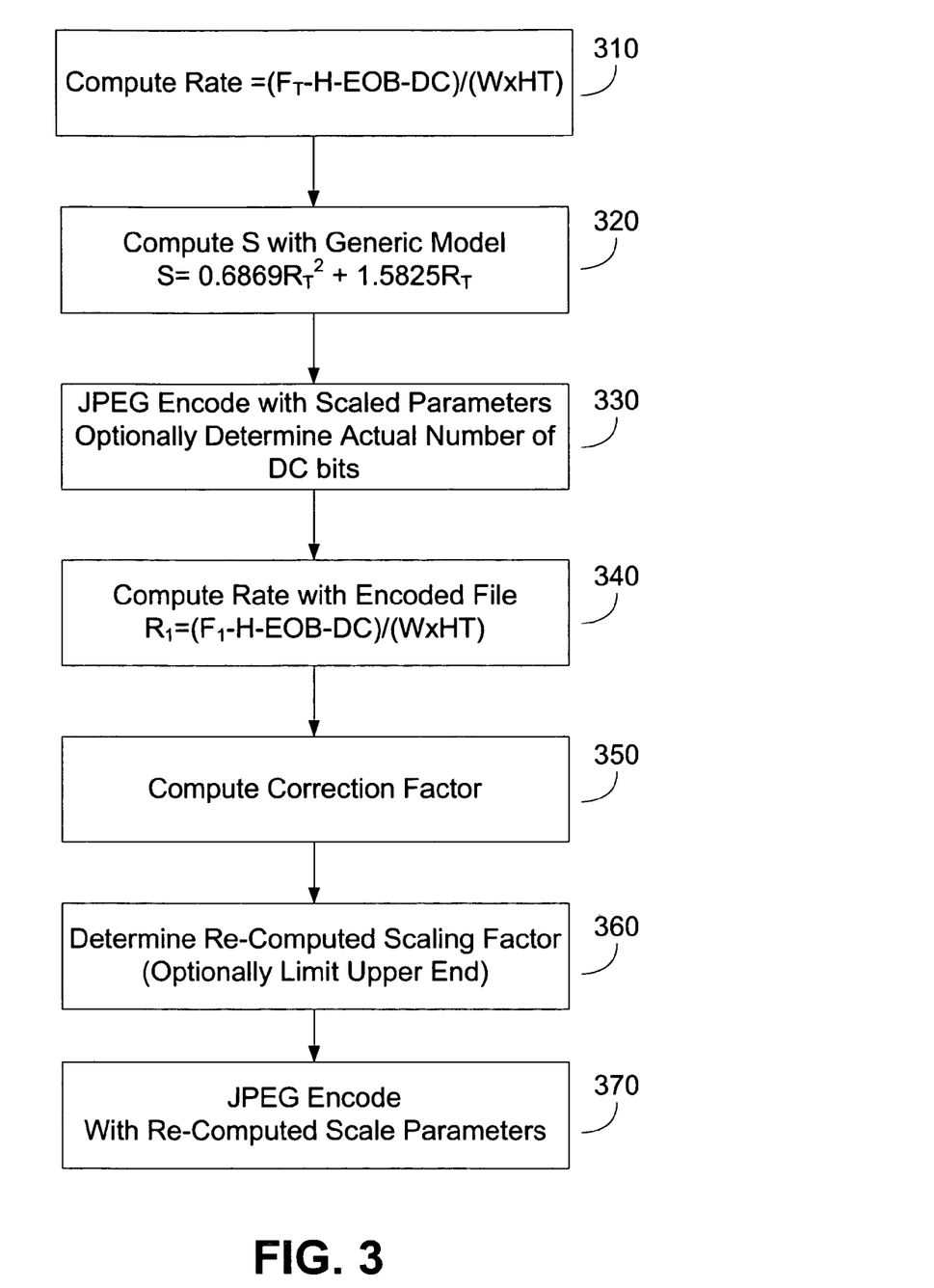
FIG. 3 is a flowchart of an embodiment of a method for dynamically scaling file encoding.

FIG. 3 is a flowchart of an embodiment of a method 300 for dynamically scaling file encoding. The method 300 shown in FIG. 3 is a particular implementation where the target rate is determined for each individual captured image file, and is based on the number of AC bits. The method 300 can be performed by the user terminal of FIG. 1 or any other device configured to scale the encoder parameters to generate an encoded file of the desired file size. The formulae in FIG. 3 make use of the following definitions:

F=JPEG file size in terms of bits
H=number of JPEG header bits
EOB=number of End of Block bits
DC=number of DC bits
AC=number of AC bits.
W=image width in terms of pixels
HT=image height in terms of pixels Initially, in block 310, the user terminal, using the scaling module, can compute a target bit rate. As previously discussed, a JPEG encoded file is most sensitive to changes in the AC quantization parameters. Thus, the target bit rate can be determined from the number of the AC bits. The JPEG encoded file includes a number of bits F=H+EOB+DC+AC. For a given target JPEG file size $F_T$, a target AC bits per pixel $R_T$ can be computed as:

$$R_T=AC/(W*HT)=(F_T-H-EOB-DC)/(W*HT)$$

As discussed earlier, H and EOB are constants and known before encoding. For example, if the default Huffman tables in JPEG standard are used in JPEG encoding, then EOB=4 for each 8×8 luminance block, and EOB=2 for each 8×8 chrominance block. DC is a small part of the JPEG bit stream but may be unknown before encoding. Thus, the number of DC bits may be estimated.

The number of DC bits can be estimated by estimating four DC bits used to encode the DC component per 8×8 block. Then, the total number of DC bits in the file can be estimated as 4*W*HT*C/(8*8) with C=1.5 for YCbCr420 format and C=2 for YCbCr422 format.

Once the target bit rate is determined, the scaling module proceeds to block 320 and determines the initial scaling factor. The scaling module can estimate the scaling factor $S_1$ by using a predetermined generic scaling factor model. As previously discussed, one embodiment of the scaling factor model that is empirically derived provides $S_1=0.6869R_T^2+1.5825R_T$.

After determining the scaling factor, the encoder, at block 330, initially encodes the captured image using the quantization parameters scaled by the initial scaling factor. The quantization parameters for the DC components are not scaled in this embodiment.

The scaling module, in block 340, can then computed an actual rate achieved using the size of the encoded image file. The JPEG encoder may also return the actual number of bits spent on encoding DC components, $DC_1$. If so, $DC_1$ can be used to replace the initial estimate of the DC value. Using the actual value for the DC number of DC bits can improve the accuracy of overall file size control since $DC_1$ is the actual DC bits instead of an estimated one.

Once the actual rate is determined, the scaling module can proceed to block 350 and determine a correction factor that is to be applied to the scaling factor. The scaling module may optionally determine a correction factor only for those encoded files that are greater or far less than a predetermined file size or bit rate. Let $R_1$ represent the actual bit rate determined in block 340. If $R_1>R_T$, then $R_1=R_1+(R_1-R_T)/4$. The correction factor can be computed as $K=S_1/(0.6869R_1^2+1.5825R_1)$.

At block 360, the scaling module recomputes the scaling factor with the correction factor. The recomputed scaling factor $S=K(0.6869R_T^2+1.5825R_T)$.

As discussed above, if the values in the standard quantization tables $Q_0$ and $Q_1$ are divided by 2, the reconstructed JPEG image is usually nearly indistinguishable from the original image. Thus, a JPEG image encoded with a scaling factor less than ½ may have almost the same perceptual quality as that encoded with a scaling factor of ½, whereas the file size of the first image may be much larger than that of the second one. Thus, the scaling module may limit the range of the scaling factor to one half. Similarly, the upper half of the scaling factor range may be limited to prevent encoded images with extremely low perceptual quality.

The encoder, at block 370, then re-encodes the captured image file with the quantization parameters scaled by the recomputed scaling factor. Again, the quantization parameters for DC components are not scaled.

In simulations of the method 300 of FIG. 3, more than 100 images were tested. For the simulations, the JPEG encoder did not return the number of DC bits $DC_1$. As a result, the estimated DC value was used in the second pass through JPEG encoding. The simulations revealed that the output bit rate for some images remained constant beyond certain target bit rate. This is due to the fact that the scaling factor is limited to be no greater than 2 in the JPEG file size control algorithm. The point at which the output bit rate stops increasing depends on the contents in the images.

The simulation results were also examined for the control errors of the algorithm for some of the tested images. The analysis revealed that the algorithm can over shoot the target bit rate by 10% in some cases. To overcome this problem, the system or method can lower the target bit rate by approximately 10 percent before running the algorithm to minimize the probability of exceeding a predetermined file size limit. Other embodiments where the JPEG encoder returns the number of DC bits $DC_1$ may improve accuracy of the algorithm and thereby reduce the amount of headroom needed in the target bit rate. The estimation error of DC bits may particularly affect the accuracy of the algorithm at low bit rates.

The flowcharts of FIGS. 2 and 3 illustrate embodiments of methods of dynamically scaling file encoding that may be implemented in the user terminal 170 of FIG. 1. In the methods shown in the flowcharts of FIGS. 2 and 3, dynamic scaling of file encoding can be performed independent of, and external to, the encoder 182. Such an implementation may be advantageous where intermediate results of the encoder 182 are not available to other modules within the user terminal 170, or where the encoder 182 is treated as a "black box" having accessible inputs and outputs but otherwise sealed. For example, the encoder 182 may be a distinct module, such as a distinct IC, that interfaces with the other modules of the user terminal 170.

Figure 4A:
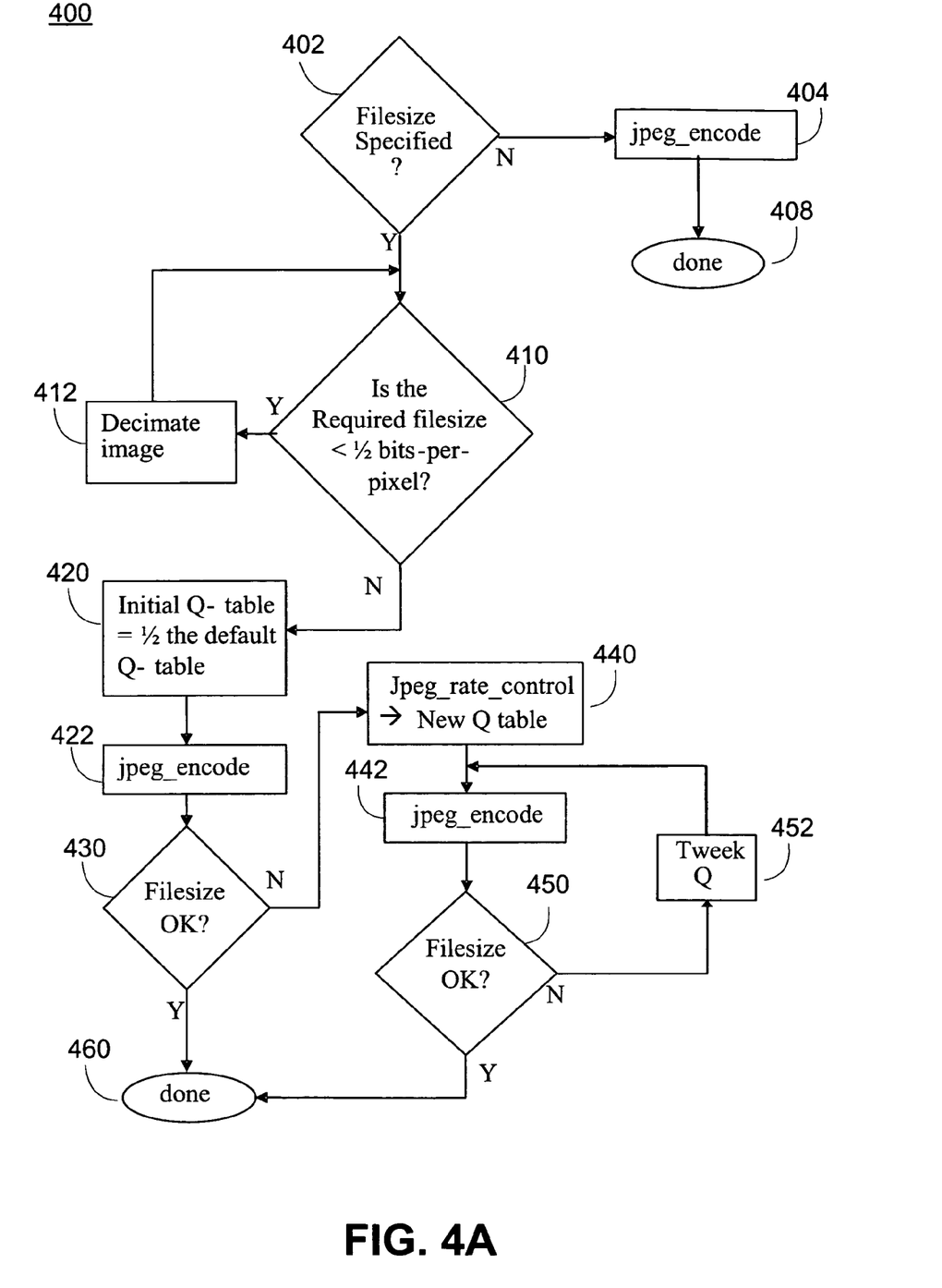
FIGS. 4A-4B are flowcharts of an embodiment of a method for dynamically scaling file encoding.

In other embodiments, the intermediate results generated by the encoder 182 may be accessible by other modules in the user terminal 170. In such a configuration, it may be advantageous to implement a method of dynamically scaling file encoding that is encoder dependent. FIG. 4A is a flowchart of an embodiment of a method 400 for dynamically scaling file encoding. The method 400 shown in the flowchart of FIG. 4A utilizes intermediate results from the JPEG encoder. In particular, the method 400 determines quantization parameters based in part on a number of non-zero quantized DCT coefficients generated by the encoder for different quantization parameter scaling factors.

The method 400 of FIG. 4A is based in part on the property of a compression algorithm where rate distortion (RD) is proportional to the fraction of non-zero elements from the DCT block. The user terminal implementing the method 400 of FIG. 4A initially encodes the captured image file using an initial quantization table. The user terminal also gathers some statistics from the encoder while the encoder is transforming the captured image file to an initial encoded image file.

The user terminal, in particular the scaling module, can be configured to determine a number of overhead bits, a number of zero DCT outputs from the encoder, and a fractional number of non-zero DCT outputs from the encoder. The scaling module can re-determine the statistics for quantization parameters scaled by a predetermined number of scaling factors. The scaling factors can be, for example, linearly spaced.

The scaling module can then determine a rate distortion curve from the statistics of the initial encoding. The scaling module can determine a scaling factor by interpolating between statistics corresponding to the scaled quantization parameters. The scaling module scales the quantization parameters with the scaling factor. The encoder re-encodes the captured image file with the scaled quantization parameters. The resultant encoded file is typically less than the target file size. If not, the scaling module can slightly tweek the quantization parameters and the encoder can re-encode the captured image file. The scaling module can continue to tweek the quantization parameters and the encoder can re-encode the captured image file until the encoded file size is less than the target file size.

The method 400 of FIG. 4A can operate once a user terminal desires to communicate an image file and presents a captured image file to the encoder or scaling module for processing. The method 400 is shown as implementing a JPEG encoder, but may be applicable to other types of encoders performing other compression algorithms.

The user terminal, at decision block 402 initially determines if a target file size is specified. For example, a user terminal may impose a target file size constraint when an image file is communicated over a wireless link but may not impose a file size constraint if the image file is to be communicated via a wired port on the user terminal.

If the file size is not constrained or otherwise specified, the user terminal proceeds to block 404 and the encoder encodes the image file. The encoder can, for example, perform JPEG encoding using nominal quantization parameters arranged in a nominal quantization table. JPEG encoding is typically understood to refer to separate chrominance and luminance encoding processes. In one embodiment, default quantization parameters and default quantization tables are those shown above in Table 1 and the nominal quantization parameters and quantization tables are determined by scaling the default parameters by one half. Other embodiments may use other default quantization parameters and quantization tables. After JPEG encoding in block 404, the user terminal proceeds to block 408 and is done.

Returning to decision block 402, if the user terminal determines that a file size constraint exists and is to be imposed on the image file, the user terminal proceeds to decision block 410. In decision block 410, the user terminal determines a number of bits per pixel based on the number of pixels in the image file and the file size constraint. The user terminal determines if the resultant bit rate for the encoded file is less than ½ bits per pixel, or some other minimum rate. If the bit rate is beneath the minimum bit rate, the encoded file produced by the encoder will be compressed with such a high compression ratio that an image recovered from the encoded file will be low quality.

Therefore, if the user terminal determines that the bit rate is less than a minimum bit rate, the user terminal proceeds to block 412 where the image file is decimated, or downsampled, to reduce the total number of pixels in the image file. The user terminal may, for example, decimate the image file by selecting one of every two pixels in the original image file. Other decimation rates may also be used. The user terminal proceeds back to decision block 410 after decimating the image file in block 412.

Returning to decision block 410, if the user terminal determines that the bit rate for the image file, whether the original image file or a decimated image file, is greater than the minimum bit rate, the user terminal proceeds to block 420.

At block 420, the user terminal determines initial quantization tables by scaling the default quantization tables shown above in Table 1 by a factor of ½. The user terminal proceeds to block 422 and JPEG encodes the image file using the initial quantization tables to produce an initial encoded file.

The user terminal proceeds to decision block 430 and determines if the file size of the initial encoded file is satisfactory. That is, the user terminal determines if the initial encoded file has a file size that is less than or equal to the target file size. If so, the user terminal proceeds to block 460 and is done.

Returning to decision block 430, if the user terminal determines that the initial encoded file size is greater than the target file size, the user terminal proceeds from decision block 430 to block 440. In block 440, the user terminal performs JPEG rate control to determine new quantization tables. The user terminal can determine, for example, a scaling factor to apply to the default quantization tables to produce the new quantization tables.

The process of determining the scaling factor is detailed in the flowchart of FIG. 4B, and is summarized below. In order to determine the scaling factor used to determine the new quantization tables, the user terminal gathers statistics from the encoder corresponding to various quantization tables. In one embodiment, the encoder or the scaling module can store the DCT coefficient values from the encoder produced with the initial quantization parameters. The user terminal can then be configured to determine the number of zero quantized DCT outputs when the encoder uses the initial quantization tables and scaled versions of the initial quantization tables. The user terminal can also determine a fractional non-zero value for the initial encoded file.

From the statistics the user terminal can determine a rate distortion curve based on the statistics from the initial encoded file, including the fractional non-zero value and a number of AC bits in the encoded file. From the rate distortion curve, the user terminal can determine a target fractional non-zero value using the rate distortion curve and a target number of AC bits. The user terminal can then determine a scaling factor from the target fractional non-zero value.

After determining the scaling factor, the user terminal proceeds to block 442 and JPEG encodes the image file with parameters of the scaled quantization tables. The image file refers to the image file that satisfies the requirements of decision block 410. The image file may be the original image file or may be a decimated version of the original image file.

After encoding the image file to produce an encoded file, the user terminal proceeds to decision block 450 to determine if the encoded file meets the file size constraints. If so, the user terminal proceeds to block 460 and is done.

However, the encoded file may not meet the file size constraints. The size of the encoded file is likely less than the file size constraint. If not, the encoded file size is typically only slightly larger than the file size constraint. In those situations, the user terminal proceeds from decision block 450 to block 452 and slightly tweeks the scaled quantization tables.

Although, the user terminal may implement any general technique to tweek the scaled quantization tables, the change needed to bring the encoded file size within the file size constraint is typically minor. In one embodiment, the user terminal can tweek the scaled quantization tables by adding a fixed amount to each of the parameters in the scaled quantization tables. For example, the user terminal can tweek the quantization parameters by adding 6, 8, 10, 15, or some other value to each of the quantization parameters of the scaled quantization tables. In another embodiment, the user terminal can tweek the scaled quantization tables by multiplying by an additional scale factor that may, for example, increase the parameter values by an additional 2, 5, 10, or 15 percent, or some other value.

After tweeking the scaled quantization tables, the user terminal returns to block 442 and re-encodes the image file using the tweeked quantization tables. The user terminal can continue to tweek the quantization tables and re-encode the image file until the encoded file size meets the file size constraint.

Figure 4B:
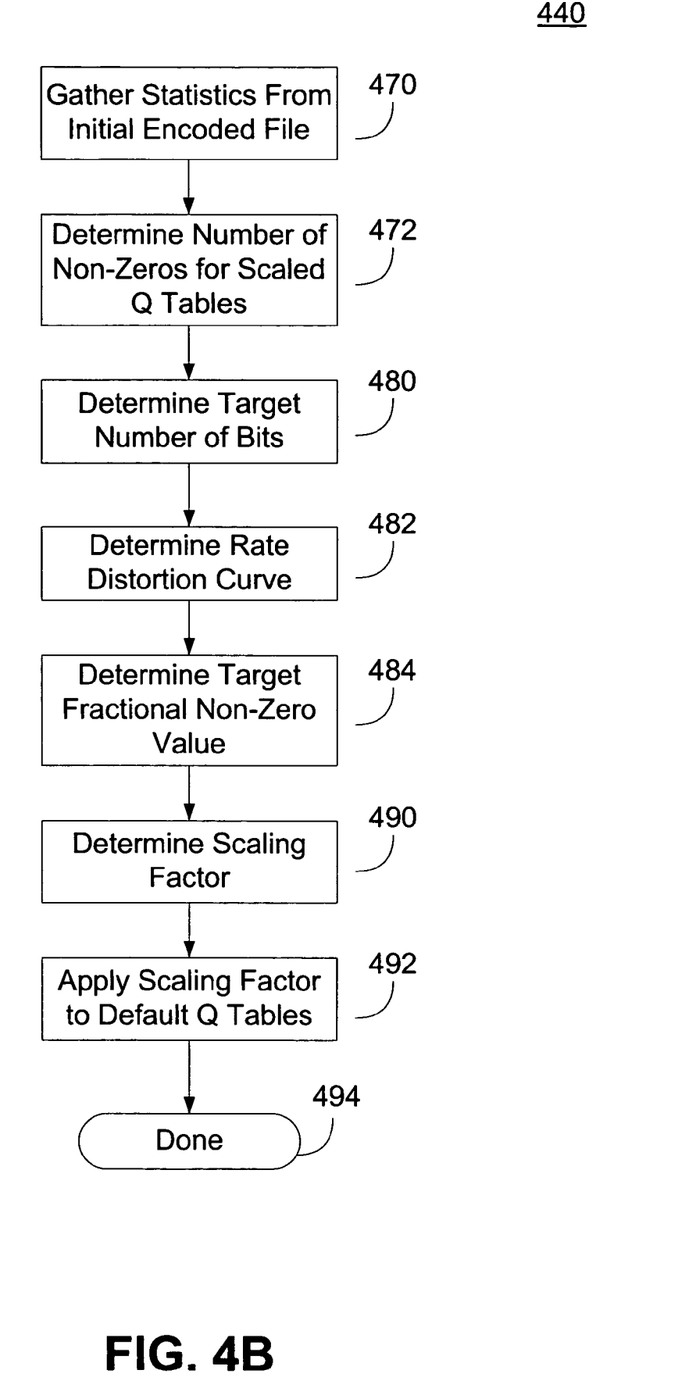

FIG. 4B is a flowchart of an embodiment of a JPEG rate control method 440 that can be performed, for example, using the scaling module of the user terminal of FIG. 1. The method 440 begins at block 470 where the scaling module gathers statistics from the encoder during processing of the initial encoded file. The statistics can include, but are not limited to: the number of overhead bits in the file, the total number of zero DCT outputs after quantization in luminance and chrominance blocks over the entire image, the total number of non-zero DCT outputs after quantization in luminance and chrominance blocks over the entire image, ands the number of bits used in run length encoding of the luminance and chrominance blocks.

The scaling module proceeds to block 472 and determines the number of non-zero DCT outputs after quantization in luminance and chrominance blocks using scaled quantization tables. In order to determine these values, the scaling module accesses the DCT output of the encoder. Because the DCT output is typically an intermediate stage of the encoder, the encoder is configured to provide access to the DCT output values.

The scaling module can determine the number of non-zero DCT outputs for a predetermined number of scaling factors applied to the quantization tables. For example, the scaling module may determine the number of non-zero DCT outputs after scaling the initial quantization table by a factor of 2, 3, 4, 5, and 6, or some other scaling factor. The scaling module can determine the total number of non-zero DCT outputs for scaled quantization table values or may determine a change in the number of non-zeros when scaling the quantization tables.

Figure 5:
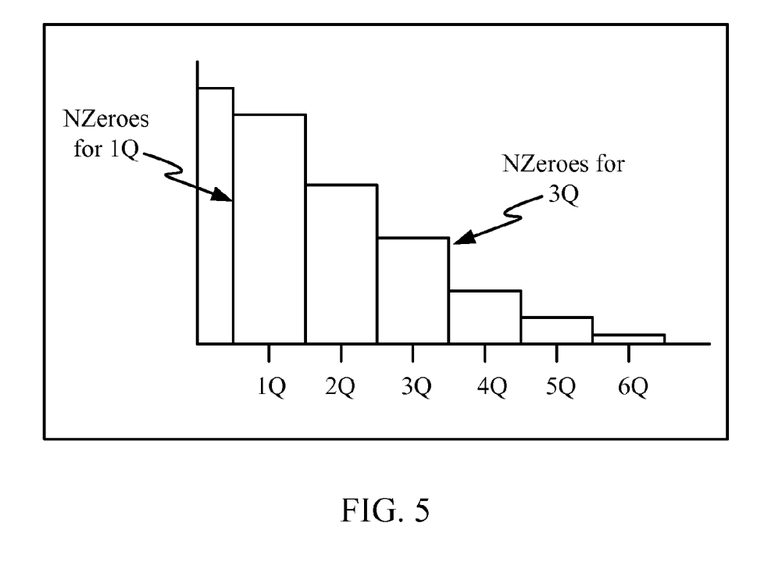
FIG. 5 is a histogram of quantized non-zero DCT outputs.

FIG. 5 is a histogram of non-zero DCT outputs for luminance values. A separate histogram can be generated for chrominance values. The bars in the histogram of FIG. 5 show an additional number of non-zero DCT outputs determined by the scaling module for various scaling factors applied to a default quantization table. The initial bar on the histogram represents the number of non-zero DCT outputs for the initial quantization matrix. As discussed earlier, the initial quantization table may be the default quantization table with the values scaled by ½.

After determining the number of non-zero DCT outputs for various scaling factors, the scaling module proceeds to block 480 to determine a target number of bits. The target number of bits may be limited to a target number of AC bits, because the number of other bits is relatively insensitive to changes in the quantization tables. Thus, the scaling module can determine:

target_$n$bits_ac_all=TargetNbits−$n$bits_overhead

The value of TargetNbits is an input to the method and nbits_overhead represents the previously determined number of overhead bits. The scaling module can separately determine a target number of AC bits for the chrominance and luminance, and can take into account that the target number of bits is a target sum of luminance and chrominance bits.

After determining the target number of bits, the scaling module proceeds to block 482 and determines a rate distortion curve. A rate distortion curve plotting rate distortion against the fractional number of non-zero elements ($\rho$) is a straight line passing through the origin.

Figure 6:
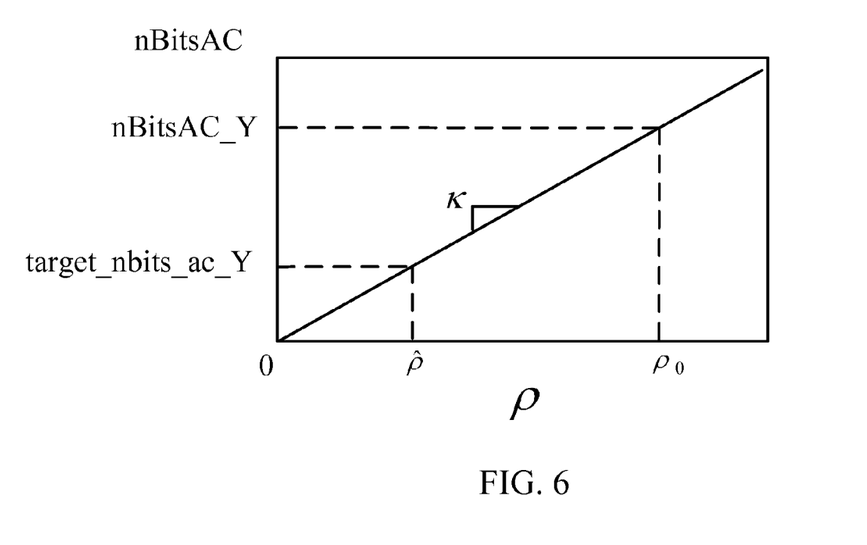
FIG. 6 is a graph of an example of a rate distortion curve.

FIG. 6 is an example of a rate distortion curve for a luminance values. Because the curve passes through the origin, the rate distortion curve is of the form:

$n$Bits$AC$=$\kappa \cdot \rho$

The slope ($\kappa$) can be determined using the statistics gathered from the initial encoded file and equals the number of AC bits in the initial encoded image divided by the fractional number of non-zero value of DCT outputs. Thus, the slope can be determined by the formula:

$$\kappa = \frac{\text{nBitsAC\_Y}}{\rho_0}$$

The scaling module proceeds to block 484 to determine a target fractional non-zero value. As shown in FIG. 6, the target fractional non-zero value ($\hat{\rho}$) can be determined from the rate distortion curve using the target bit rate, here shown as a target AC bit rate.

Figure 7:
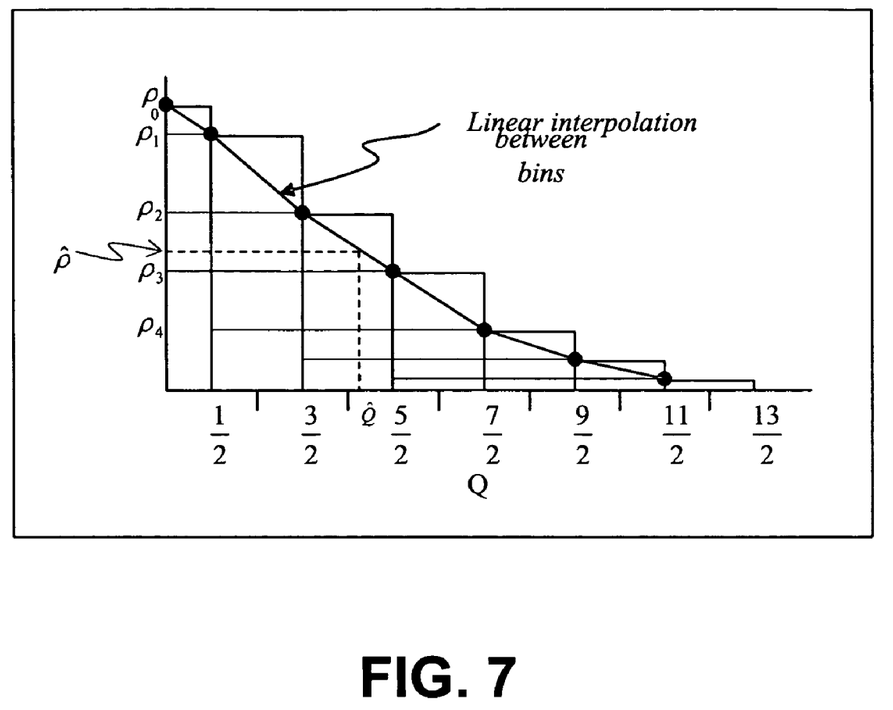
FIG. 7 is a graphical illustration of determining a scaling factor based on quantized DCT coefficients.

After determining the target fractional non-zero value, based at least in part on the rate distortion curve, the scaling module proceeds to block 490 to determine a scaling factor to use in re-encoding the image file. FIG. 7 is a graphical illustration of determining a scaling factor based on quantized DCT coefficients.

As shown in FIG. 7, each of the histogram values corresponds to a fractional number of non-zero elements ($\rho$). Using the target fractional non-zero value ($\hat{\rho}$) previously determined in block 484, the scaling module can interpolate between two $\rho$ values to determine a scaling factor. In the example of FIG. 7, the scaling factor is proportional to ($\hat{Q}$), and is determined as 2×$\hat{Q}$.

After determining the scaling factor, the scaling factor applies the scaling factor to the default quantization tables in block 492 to generate scaled quantization tables. The scaling module proceeds to block 494 and the JPEG rate control method 440 is done.

Apparatus, systems, and methods for dynamically scaling file encoding has been disclosed. The methods, systems, and apparatus can use a two pass encoding process whereby a target bit rate and associated target encoded file size can be achieved from an initial file. The initial unencoded file is encoded using a quantization parameters scaled by a scaling factor determined from a scaling factor model. The resultant encoded file can be examined for conformance with a predetermined encoded file size constraint.

The scaling factor can be recomputed for those encoded files not initially conforming with the predetermined file size constraint. A scaling module can determine a corrected bit rate and a correction factor to be applied to the initial scaling factor to produce a recomputed scaling factor. The original file can then be re-encoded using the quantization factors scaled by the recomputed scaling factor to produce an encoded file that conforms to the predetermined file size constraint.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of scaling a file to produce an encoded file having a file size less than a file size constraint, the method comprising:
   determining a target bit rate;
   determining an initial scale factor;
   at an encoder, encoding a source file using quantization parameters scaled with the initial scale factor to produce an initial encoded file;
   determining a revised bit rate, wherein determining the revised bit rate comprises determining an AC bit rate of the initial encoded file;
   determining a scaling factor; and
   re-encoding the source file using quantization parameters scaled with the scaling factor to produce the encoded file.

2. The method of claim 1, wherein determining a target bit rate comprises determining a target AC bit rate based in part on a target file size.

3. The method of claim 1, wherein determining a target bit rate comprises determining a target file size divided by a number of pixels in the source file.

4. The method of claim 1, wherein determining a target bit rate comprises:
   estimating a number of DC bits in the source file; and
   determining a difference of the number of DC bits from a target file size to produce a target AC bit estimate.

5. The method of claim 4, wherein determining a target bit rate further comprises determining the quotient of the AC bit estimate to a number of pixels in the source file.

6. The method of claim 1, wherein determining an initial scale factor comprises determining the initial scale factor by applying the target bit rate to a polynomial model of a scale factor response.

7. The method of claim 1, wherein encoding a source file comprises JPEG encoding a captured image file using AC quantization parameters scaled with the initial scale factor.

8. The method of claim 1, wherein determining a scaling factor comprises;
   computing a correction factor based in part on the revised bit rate; and
   determining the scaling factor as the product of the correction factor and the initial scale factor.

9. The method of claim 8, further comprising setting the scaling factor to a predetermined value if the product of the correction factor and the initial scale factor exceeds the predetermined value.

10. The method of claim 1, further comprising:
    capturing an image file with a camera; and
    storing the image file in memory as the source file.

11. The method of claim 1, further comprising transmitting the encoded file to a destination device using a wireless communication link.

12. An encoding system, the system comprising:
    an encoder configured to encode a source file using quantization parameters scaled by a scaling factor to produce an encoded file having a target file size less than a file size of the source file; and
    a scaling module configured to determine the scaling factor used by the encoder based in part on the target file size and the file size of the source file, wherein the scaling module is configured to generate an initial scale factor based in part on the file size of the source file;
    wherein the encoder is configured to encode the source file using quantization parameters scaled by the initial scale factor to produce an initial encoded file;
    wherein the scaling module determines the scaling factor based in part on a file size of the initial encoded file; and
    wherein the scaling module is configured to determine a correction factor based on the file size of the initial encoded file and determines the scaling factor as a product of the initial scale factor and the correction factor.

13. The system of claim 12, wherein the scaling module determines the initial scale factor using a scaling factor model.

14. The system of claim 12, wherein the scaling module determines the initial scale factor using a predetermined polynomial.

15. The system of claim 12, wherein the scaling module determines the initial scale factor by determining a target bit rate based on a number of pixels in the source file.

16. The system of claim 12, wherein the scaling module determines the initial scale factor by determining a target bit rate based in part on a number of AC bits in the target file size.

17. The system of claim 12, wherein the scaling module sets the scaling factor to a predetermined number if the product of the initial scale factor and the correction factor exceeds the predetermined number.

18. The system of claim 12, wherein the encoder comprises a JPEG encoder.

19. The system of claim 12, wherein the encoder is configured to encode the source file using AC quantization parameters scaled by the scaling factor and unscaled DC quantization parameters.

20. The system of claim 12, wherein the quantization parameters scaled by the scaling factor comprise AC quantization parameters.

21. The system of claim 12, wherein the quantization parameters comprise JPEG quantization parameters.

22. The system of claim 12, wherein the encoding system comprises a mobile station configured to communicate over a wireless communication system.

23. The system of claim 12, wherein the encoding system comprises a wireless base station.

24. The system of claim 12, further comprising:
    memory coupled to the encoder and configured to store the source file; and
    a camera configured to capture an image file and store it in the memory as the source file.

25. The system of claim 12, further comprising a wireless transceiver coupled to the encoder and configured to transmit the encoded file over a wireless communication link.

26. A computer readable medium storing computer executable code, comprising:
    code executable by a computer to determine a target bit rate;
    code executable by the computer to determine an initial scale factor;
    code executable by the computer to encode a source file using quantization parameters scaled with the initial scale factor to produce an initial encoded file;
    code executable by the computer to determine a revised bit rate by determining an AC bit rate of the initial encoded file;

code executable by a computer to determine a scaling factor; and code executable by a computer to re-encode the source file using quantization parameters scaled with the scaling factor to produce the encoded file.

27. A method of scaling a file to produce an encoded file having a file size less than a file size constraint, the method comprising:

estimating a number of DC bits in an image file;

subtracting the number of DC bits from a target file size to produce an AC bit estimate;

determining a target rate as the value of the AC bit estimate divided by a number of pixels in the image file;

determining an initial scale factor based in part on the target rate;

at an encoder, encoding the image file using quantization parameters scaled by the initial scale factor to produce the encoded file;

determining a bit rate based in part on a size of the encoded file;

determining a correction factor based on the bit rate;

determining a recomputed scaling factor as the product of the correction factor and the initial scale factor; and encoding the image file with the encoder using quantization parameters scaled by the recomputed scaling factor.

28. The method of claim 27, wherein the encoder comprises a JPEG encoder.

29. A method of scaling a file to produce an encoded file having a file size less than a file size constraint, the method comprising:

determining a target bit rate;

determining an initial scale factor;

at an encoder, encoding a source file using quantization parameters scaled with the initial scale factor to produce an initial encoded file;

determining a revised bit rate;

determining a scaling factor; wherein determining the scaling factor comprises computing a correction factor based in part on the revised bit rate; and determining the scaling factor as the product of the correction factor and the initial scale factor; and re-encoding the source file using quantization parameters scaled with the scaling factor to produce the encoded file.

30. An encoding system, the system comprising:

a JPEG encoder configured to encode a captured image file to produce an encoded image file, the JPEG encoder encoding at least AC bits of the captured image file using quantization parameters scaled by a scaling factor; and a scaling module coupled to the JPEG encoder and configured to determine an initial scale factor based in part on a target file size and a number of pixels in the captured image file, and wherein the JPEG encoder is configured to encode the AC bits of the captured image file using quantization parameters scaled by the initial scale factor to produce an initial encoded file, wherein the scaling module determines the scaling factor based in part on a file size of the initial encoded file, and wherein the scaling module is configured to determine a correction factor based on the file size of the initial encoded file and configured to determine the scaling factor as a product of the initial scale factor and the correction factor.

31. The system of claim 30, further comprising:

memory coupled to the encoder and configured to store the captured image file; and a camera configured to generate the captured image file and store the captured image file in the memory.

32. The system of claim 30, further comprising a wireless transceiver coupled to the encoder and configured to transmit the encoded image file over a wireless communication link.

33. The system of claim 30, wherein the encoding system comprises a wireless telephone.

* * * * *